United States Patent
Backes et al.

(10) Patent No.: US 9,442,354 B2
(45) Date of Patent: Sep. 13, 2016

(54) OPTICAL PROJECTION DEVICE FOR AN ICON DISPLAY ELEMENT

(75) Inventors: Ulrich Backes, Radolfzell (DE); Harald Kohnlein, Gottmadingen (DE)

(73) Assignee: TRW Automotive Electronics & Components GmbH (DE)

( * ) Notice: Subject to any disclaimer, the term of this patent is extended or adjusted under 35 U.S.C. 154(b) by 309 days.

(21) Appl. No.: 13/879,857

(22) PCT Filed: Dec. 14, 2011

(86) PCT No.: PCT/EP2011/006317
§ 371 (c)(1),
(2), (4) Date: May 15, 2013

(87) PCT Pub. No.: WO2012/079758
PCT Pub. Date: Jun. 21, 2012

(65) Prior Publication Data
US 2013/0329197 A1 Dec. 12, 2013

(30) Foreign Application Priority Data
Dec. 14, 2010 (DE) .......... 10 2010 054 449

(51) Int. Cl.
*G03B 21/20* (2006.01)
*B60Q 3/04* (2006.01)
*G03B 21/08* (2006.01)
*G03B 21/00* (2006.01)

(52) U.S. Cl.
CPC ........... *G03B 21/2013* (2013.01); *B60Q 3/044* (2013.01); *G03B 21/001* (2013.01); *G03B 21/08* (2013.01); *G03B 21/20* (2013.01)

(58) Field of Classification Search
CPC ..... F21S 13/00; H04N 9/3197; G03B 21/00; G03B 21/08; G03B 21/20; G03B 21/10; G03B 21/56; B60Q 3/00; B60Q 3/04
USPC .......................................................... 353/97
See application file for complete search history.

(56) References Cited

U.S. PATENT DOCUMENTS

| | | | |
|---|---|---|---|
| 2005/0122481 A1* | 6/2005 | Yamasaki et al. | 353/31 |
| 2005/0157499 A1* | 7/2005 | Kim | 362/293 |
| 2006/0221305 A1* | 10/2006 | Magarill | 353/31 |
| 2008/0203755 A1* | 8/2008 | Bourgeois-Jacquet et al. | 296/97.5 |

FOREIGN PATENT DOCUMENTS

| | | |
|---|---|---|
| CH | 212756 | 12/1940 |
| DE | 601 01 757 | 1/2004 |
| DE | 10 2008 000 375 | 10/2008 |
| EP | 2 015 126 | 1/2009 |
| EP | 2015126 A1 * | 1/2009 |
| FR | 2 578 797 | 9/1986 |
| FR | 2 705 293 | 11/1994 |

* cited by examiner

*Primary Examiner* — Sultan Chowdhury
*Assistant Examiner* — Danell L Owens
(74) *Attorney, Agent, or Firm* — Tarolli, Sundheim, Covell & Tummino LLP

(57) ABSTRACT

A simple optical projection device with a high luminous efficacy has a point light source, a projection screen, a mask that is arranged in the light path upstream of the projection screen and is light-transmissive in some areas, and a light focusing optical lens arranged between the point light source and the mask. The optical lens is selected such that the prolongations of the emerging beams of the optical lens on the side thereof facing the point light source intersect in a virtual perspective center which is more remote from the lens than the point light source.

11 Claims, 5 Drawing Sheets

OPTICAL PROJECTION DEVICE FOR AN ICON DISPLAY ELEMENT

RELATED APPLICATIONS

This application corresponds to PCT/EP2011/006317, filed Dec. 14, 2011, which claims the benefit of German Application No. 10 2010 054 449.3, filed Dec. 14, 2010, the subject matter of which are incorporated herein by reference in their entirety.

BACKGROUND OF THE INVENTION

The present invention relates to an optical projection device.

Optical projection devices having an optical mask that is shone through by the light path, for example a slide, have long been known. In the simplest form of an optical projection device, a point light source is used, starting from which a diverging beam of rays passes through the optical mask and impinges on a projection screen. Since with such a simple optical projection device, only a small part of the radiation emerging from the point light source can be utilized, in traditional projection devices the partly transmissive mask is illuminated as uniformly as possible by means of an illumination arrangement with maximum possible exploitation of the light source radiation, while an optical imaging arrangement serves for as precise as possible an imaging of the planar object geometry of the mask onto the reflective or transmissive projected area. In such a conventional projection system the luminous efficacy is typically also relatively low since a considerable portion of the light is lost due to diffusion. In addition, the expenditures for materials and design for such a system are very high.

SUMMARY OF THE INVENTION

There is a need for a simple optical projection device that has a high luminous efficacy. This object is achieved in accordance with the invention by means of an optical projection device which includes a point light source, a projection screen, a mask that is arranged in the light path upstream of the projection screen and is light-transmissive in some areas, and a light focusing optical lens arranged between the point light source and the mask. The optical lens is selected such that the prolongations of the emerging beams of the optical lens on the side thereof facing the point light source intersect in a virtual perspective center which is more remote from the lens than the point light source. The optical lens can be arranged close to the point light source and in this way takes up the largest part of the optical radiation emerging therefrom. This results in the high luminous efficacy. The projection beams emerging from the exit face of the lens pass through the mask and directly impinge on the projected area of the projection screen, with no losses in light intensity occurring, except as caused by the mask itself. For a given brightness of the projected image, therefore only a low light intensity from the point light source is needed.

The geometry of the optical lens is largely determined by the structural space available. Since the lens has light focusing properties, it is typically convex on the exit side. The light entrance face of the lens may be planar or else concave. The optical lens may be arranged so as to be tilted with respect to the planes of the projection screen and the mask, whereby a compact design is achieved.

According to an advantageous embodiment, a plurality of optical lenses, each with an associated point light source, is arranged so as to be oppositely tilted with respect to the planes of the projection screen and the mask.

In order to allow a plurality of icons to be displayed jointly or separately on a common projected area, the projection beams emerging from the plurality of point light sources pass through different surface regions of the mask and occupy a common projected area on the projection screen.

The optical projection device according to the invention is well suited as an icon display element for a vehicle interior. In this case, the projection screen is formed by a front cover of the icon display element. The icons may be displayed individually or jointly. To this end, the various point light sources are driven in a suitable manner.

BRIEF DESCRIPTION OF THE DRAWINGS

Further features and advantages of the invention will be apparent from the description below of several embodiment examples and from the accompanying drawings, to which reference is made.

In the drawings.

DESCRIPTION OF EXEMPLARY EMBODIMENTS

Figure 1:
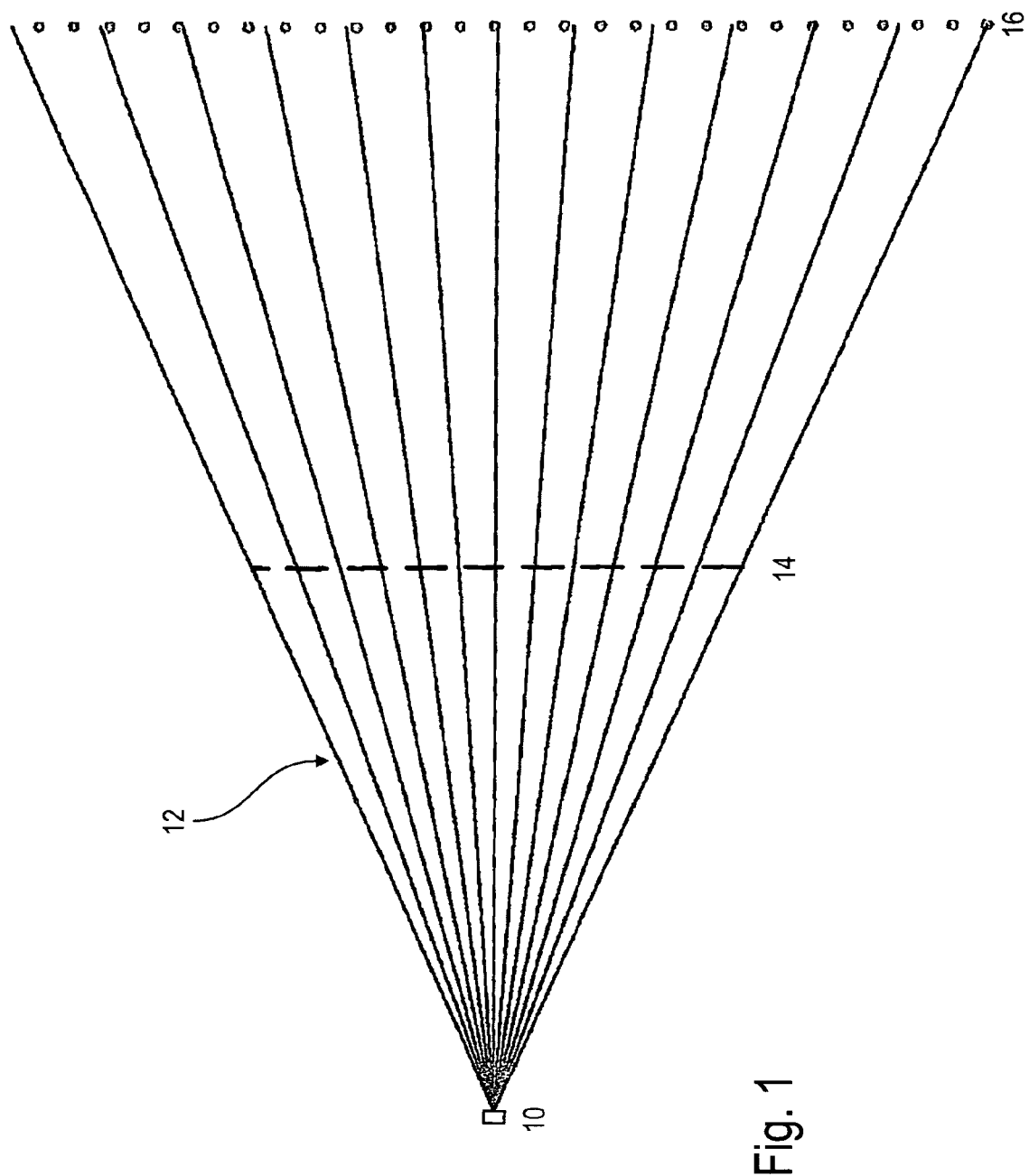
FIG. 1 shows a simple image projection device with merely a point light source, a mask and a projection screen.

FIG. 1 illustrates a very simple optical projection device. It is comprised of a point light source 10 which emits a diverging bundle 12 of rays, an optical mask 14 that is light-transmissive in some areas, and a projection screen 16 which may be formed by a diffusion disk. FIG. 1 only shows that part of the diverging bundle 12 of rays which passes through the mask 14. Actually, the light emerging from the light source 10 has a much greater angle of beam spread, so that only a small part thereof is utilized. This optical projection device therefore has a low luminous efficacy. In addition, it requires a large amount of space in the axial direction.

Figure 2:
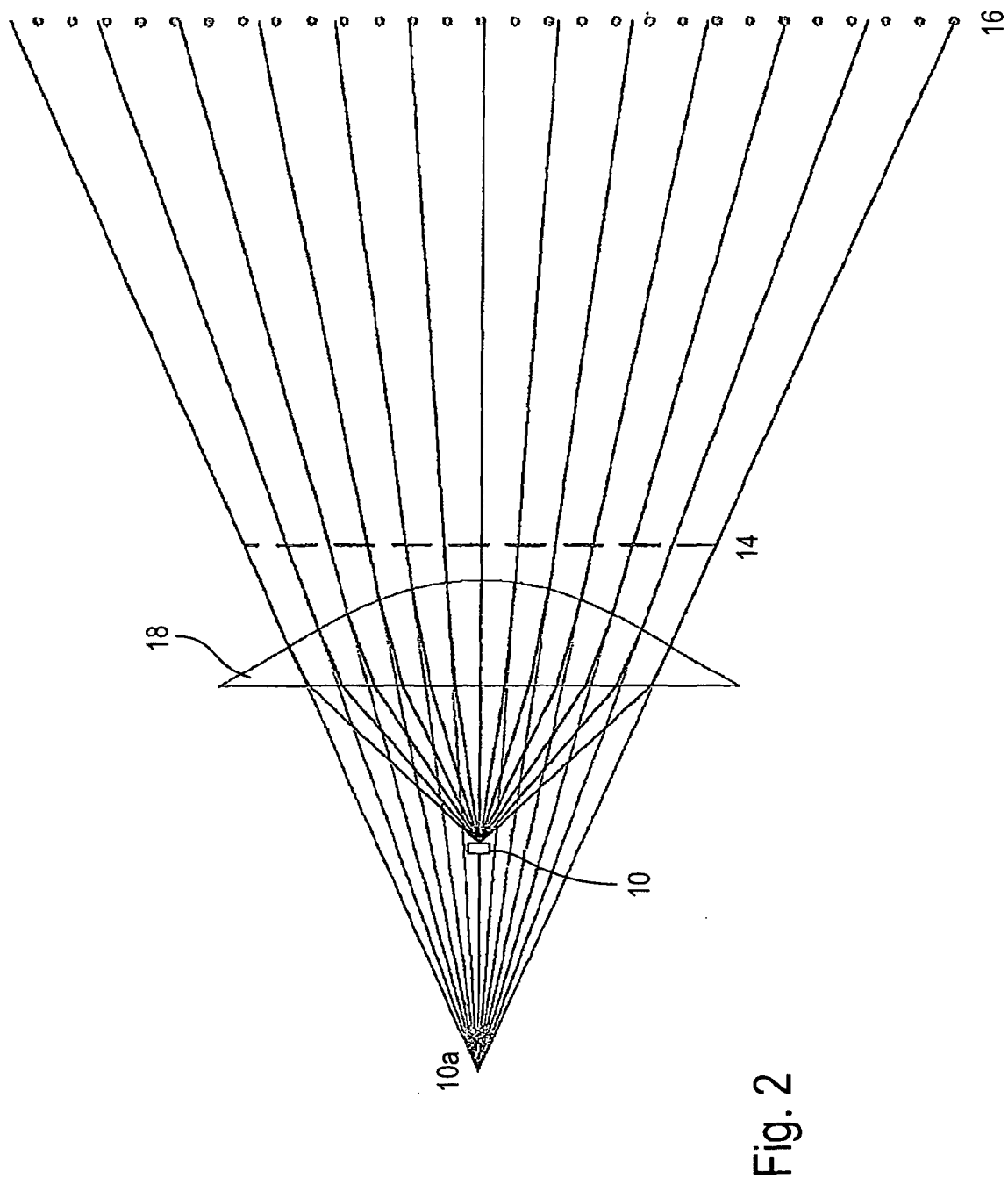
FIG. 2 shows a projection device according to the invention.

The projection device according to the invention as shown in FIG. 2 is structured similarly to the one shown in FIG. 1, but has an optical lens 18 with light focusing properties arranged in the light path between the point light source 10 and the optical mask 14. In the embodiment shown, the entrance face of the lens 18 is planar and the exit face is convexly curved. The geometry of the lens 18 is determined such that the emerging beams of the lens 18 on the side thereof facing the point light source 10 intersect in a virtual perspective center 10a which is more remote from the lens 18 than the point light source 10. The point light source 10 may be arranged very close to the entrance face of the optical lens 18, so that the largest part of the light radiation emerging from it is taken up by the lens 18. This results in a high luminous efficacy. In addition, the axial overall length is considerably reduced as compared with that of the projection device shown in FIG. 1.

Figure 3:
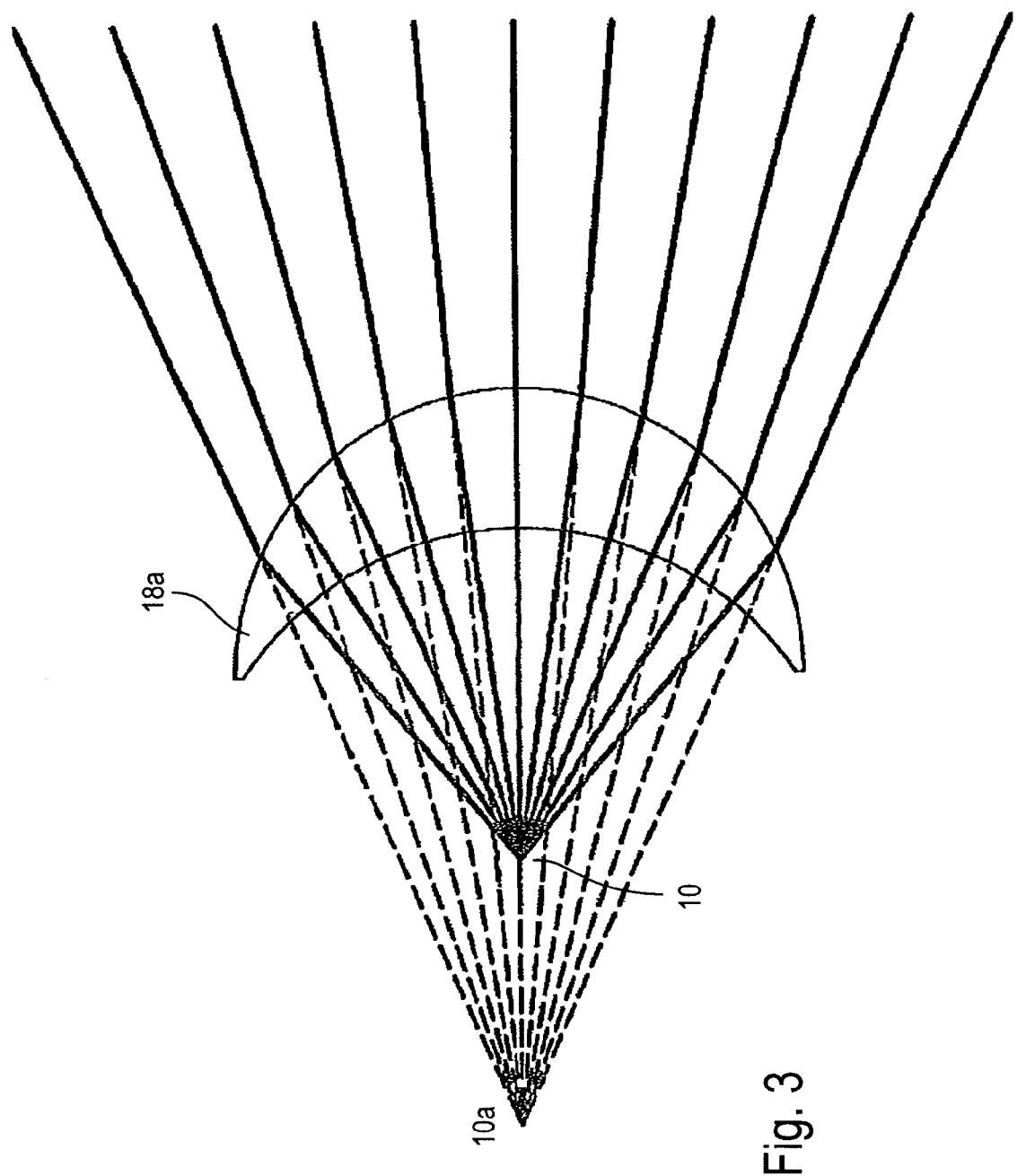
FIG. 3 shows a projection device having a special light focusing lens.

The embodiment of the lens 18a as shown in FIG. 3, having a concave entrance face and a convex exit face allows a particularly compact structural design. The point light source 10 can be arranged still closer to the entrance face of the lens 18a here, as a result of which a compact design is obtained, accompanied by an even further increase in luminous efficacy.

Figure 4:
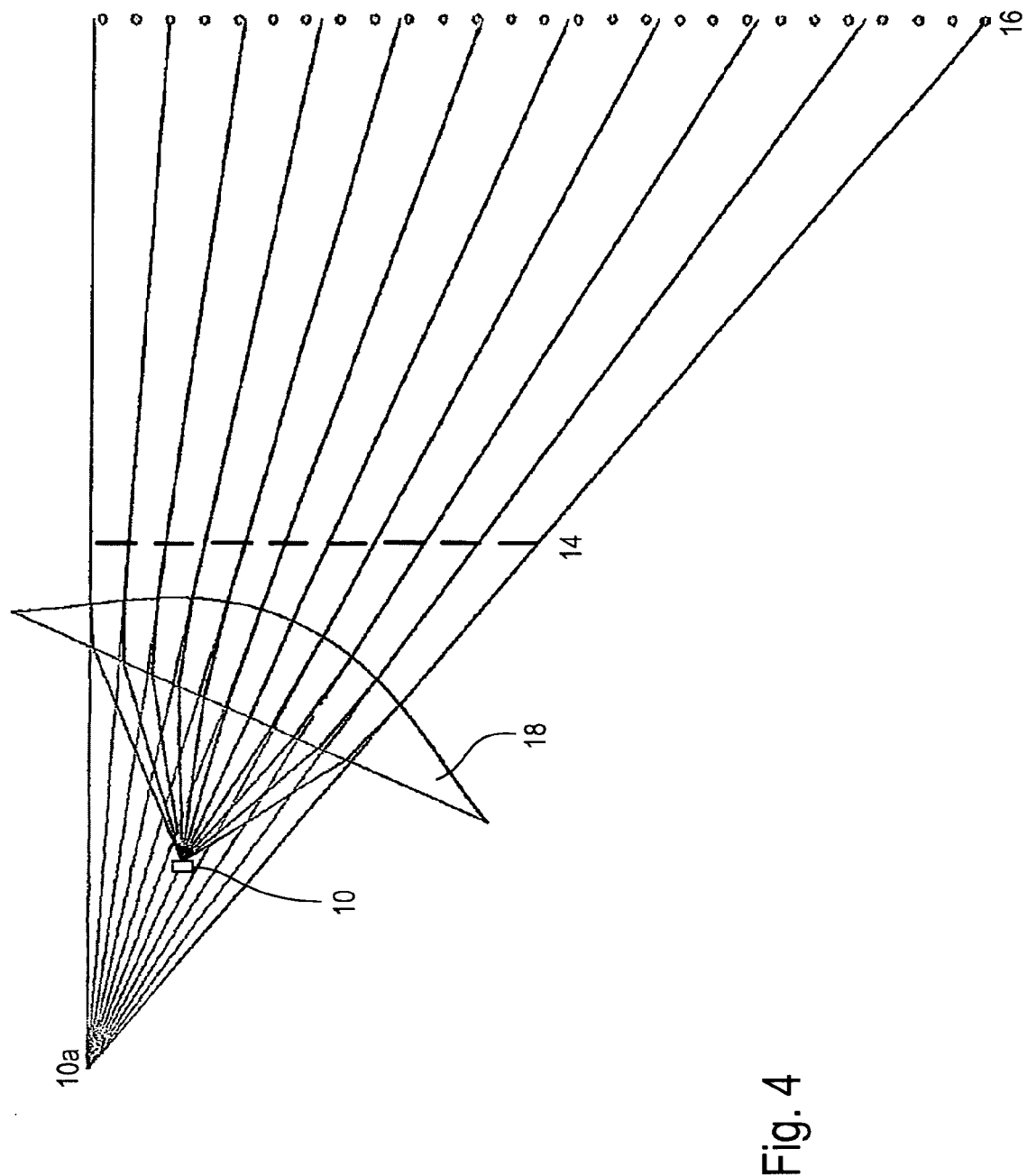
FIG. 4 shows an embodiment of the projection device with tilted lens.

The embodiment in FIG. 4 differs from that in FIG. 2 in that the lens 18 is tilted with respect to the planes of the mask 14 and of the projection screen 16. This allows an adjustment to given structural conditions. In addition, this arrangement is well suited to be employed in a further embodiment of the projection device as shown in FIG. 5.

Figure 5:
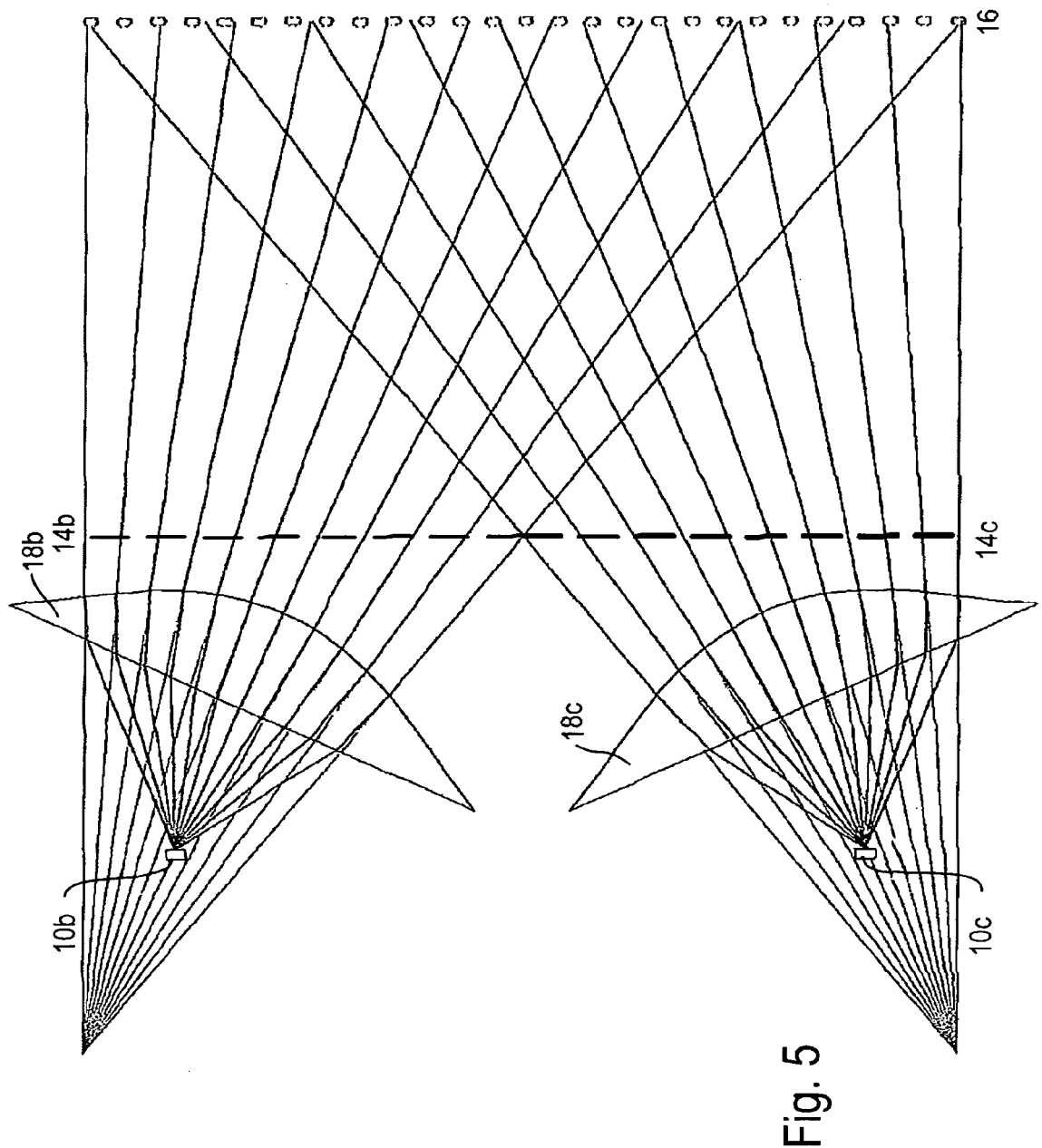
FIG. 5 shows an embodiment of a double projection device.

The embodiment of the optical projection device as shown in FIG. 5 includes two mirror-symmetrically arranged projection systems, each including a point light source, a lens, an optical mask, and a shared projection screen. The first projection system is structured and arranged just like that in FIG. 4. Accordingly, it contains a first point light source 10b, a first lens 18b, a first mask 14b, and the projection screen 16. The second projection system contains a point light source 10c, a lens 18c, an optical mask 14c, and the projection screen 16. It can be seen that while the two projection systems shine through separate regions of an optical mask on the exit sides of the lenses 18b, 18c, they occupy a common projected area on the projection screen 16. By a selective activation of the point light sources 10b and 10c, different icons can therefore be displayed on the same projected area of the projection screen 16. But combined icons may also be displayed by activating both point light sources at the same time. The number of projection systems may, of course, be greater than two, and the icon representations generated by the different projection systems need not occupy the same projected area on the projection screen.

A special application of the optical projection device, in particular in the configuration shown in FIG. 5, is an icon display element for a vehicle interior. In such an application the projection screen is formed by a front cover of the icon display element, the front cover acting as a diffusion disk.

The invention claimed is:

1. An optical projection device for a vehicle interior comprising:
    a plurality of point light sources,
    a projection screen,
    a mask that is arranged in the light path upstream of the projection screen and is light-transmissive in some areas, and
    a plurality of light focusing optical lenses, each with an associated point light source and arranged between the associated point light source and the mask, wherein the prolongations of the emerging beams of each optical lens on the side thereof facing the associated point light source intersect in a virtual perspective center which is more remote from the lens than the associated point light source,
    wherein the plurality of optical lenses are arranged so as to be oppositely tilted with respect to the planes of the projection screen and the mask,
    wherein the projection beams from each point light source do not intersect the projection beams from each other point light source between the optical lenses and the mask and are divergent between the optical lenses and the mask.

2. The optical projection device according to claim 1, wherein each optical lens includes a convex exit face and a planar or concave entrance face.

3. The optical projection device according to claim 1, wherein the projection beams emerging from the plurality of point light sources and exiting from the associated lenses pass through different surface regions of the mask and occupy a common projected area on the projection screen.

4. The optical projection device according to claim 3, wherein the plurality of point light sources is adapted to be selectively activated.

5. The optical projection device according to claim 1, wherein the projection beams emerging from the plurality of point light sources and exiting from the associated lenses are optically screened from each other up to the mask.

6. The optical projection device according to claim 1, comprising a diffusion disk as the projection screen.

7. An icon display element for the vehicle interior, comprising an optical projection device according to claim 1, wherein the projection screen is formed by a front cover of the icon display element.

8. The optical projection device according to claim 1, wherein the projection beams from each point light source intersect the projection beams from another point light source between the mask and the projection screen.

9. An optical projection device for a vehicle interior comprising:
    an icon display element in the vehicle interior having a front cover;
    at least one point light source for producing light beams directed towards the front cover;
    a mask positioned between the point light source and the front cover and having light-transmissive portions through which the light beams pass; and
    a light focusing optical lens positioned between each point light source and the mask for receiving the light beams, the light beams emerging from each lens along a light path towards the mask, prolongations of each light path in a direction extending away from the mask intersecting at a virtual perspective center that is spaced further from the lens than the point light source.

10. The optical projection device according to claim 9, wherein the at least one point light source comprises a plurality of point light sources, and wherein the light beams from each point light source do not intersect the light beams from each other point light source between the optical lenses and the mask and are divergent between the optical lenses and the mask.

11. The optical projection device according to claim 10, wherein the light beams from one point light source intersect the light beams from another point light source between the mask and the front cover.

* * * * *